US010739484B2

(12) United States Patent
Srinivasan (10) Patent No.: US 10,739,484 B2
(45) Date of Patent: Aug. 11, 2020

(54) CURVELET 4D: 4D DENOISE IN CURVELET DOMAIN

(71) Applicant: Arjun Srinivasan, Cypress, TX (US)

(72) Inventor: Arjun Srinivasan, Cypress, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 321 days.

(21) Appl. No.: 15/876,807

(22) Filed: Jan. 22, 2018

(65) Prior Publication Data

US 2018/0259662 A1    Sep. 13, 2018

Related U.S. Application Data

(60) Provisional application No. 62/469,834, filed on Mar. 10, 2017.

(51) Int. Cl.
*G01V 1/30* (2006.01)
*G01V 1/32* (2006.01)

(52) U.S. Cl.
CPC .............. *G01V 1/308* (2013.01); *G01V 1/325* (2013.01); *G01V 2210/322* (2013.01); *G01V 2210/612* (2013.01)

(58) Field of Classification Search
None
See application file for complete search history.

(56) References Cited

U.S. PATENT DOCUMENTS

| 6,438,069 | B1 * | 8/2002 | Ross | G01V 1/288 |
| | | | | 367/73 |
| 8,280,695 | B2 | 10/2012 | Neelamani et al. | |
| 9,535,181 | B2 * | 1/2017 | Poole | G01V 1/36 |
| 9,864,084 | B2 * | 1/2018 | Poole | G01V 1/36 |
| 2013/0253838 | A1 | 9/2013 | Tegtmeier-Last et al. | |

(Continued)

OTHER PUBLICATIONS

Aravkin et al. Fast Methods for Denoising Matrix Completion Formulations, With Applications to Robust Seismic Data Interpolation. 2014 (Year: 2014).*

(Continued)

*Primary Examiner* — Roy Y Yi
(74) *Attorney, Agent, or Firm* — ExxonMobil Upstream Research Company-Law Department (57) ABSTRACT

A computer implemented method for denoising a set of seismic datasets, specifically belonging to different 3D subsets of a 4D survey the method including: (a) receiving a baseline and a monitor seismic dataset which were acquired by surveying over the same subsurface formation over different periods of time; (b) cross-equalizing the monitor seismic dataset to match to the baseline seismic dataset in terms of amplitude, frequency, phase and timing of events; (c) computing an initial 4D difference between the monitor and baseline seismic datasets; (d) formulating a common noise template from the initial 4D difference; (e) de-noising the baseline and monitor seismic datasets, independently, using the common noise template in a curvelet domain; (f) updating the initial 4D difference to form an updated 4D difference, which reflects de-noised baseline and monitor datasets from step (e); and iterating the steps (d) through (F) until the updated 4D difference satisfies a predetermined criteria.

15 Claims, 10 Drawing Sheets

(56) References Cited

U.S. PATENT DOCUMENTS

2015/0346369 A1 12/2015 Peng et al.
2017/0248716 A1* 8/2017 Poole ..................... G01V 1/28

OTHER PUBLICATIONS

Hennenfent et al. Nonequispaced Curvelet Transform for Seismic Data Reconstruction: A Sparsity-Promoting Approach, Geophysics, vol. 75, No. 6, WB203-WB210, 2010 (Year: 2010).*
Cristall et al. Curvelet Processing and Imaging: 4D adaptive subtraction, CSEG National Convention, 2004 pp. 1-4 (Year: 2004).*
Rickett et al. ("A Cross-equalization Processing Flow for off-the shelf 4-D Seismic Data" Stanford Exploration Project, Project 97, Jul. 8, 1998 p. 265-275) (Year: 1998).*

* cited by examiner

CURVELET 4D: 4D DENOISE IN CURVELET DOMAIN

CROSS-REFERENCE TO RELATED APPLICATION

This application claims the benefit of U.S. Provisional Patent Application 62/469,834 filed Mar. 10, 2017 entitled CURVELET 4D: 4D DENOISE IN CURVELET DOMAIN, the entirety of which is incorporated by reference herein.

TECHNOLOGICAL FIELD

This disclosure relates generally to the field of geophysical prospecting and, more particularly, to seismic data processing. Specifically, the disclosure relates to a method for processing time-lapse or 4D seismic data.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Seismic data is one of the most commonly used geophysical prospecting tools that is used to efficiently develop hydrocarbon reservoirs, which must be properly processed in order to allow interpretation of subsurface features including changes in fluid content or changes in pressure within a rock formation. Generally, seismic data is acquired by using active seismic sources to inject seismic energy into the subsurface which is then refracted or reflected by subsurface features and recorded at seismic receivers. For 4D seismic data, a first realization of the subsurface is acquired, usually pre-production, to obtain a 'baseline' seismic dataset and subsequent monitoring seismic surveys are acquired over the same subsurface formation to obtain one or more 'monitor' seismic dataset(s). In practice, seismic data is often contaminated by noise which may be coherent or incoherent (e.g. random) in nature. In 4D seismic comparisons, slight differences in survey parameters and/or processing can result in differences in amplitude and/or phase which may further contaminate the results.

4D seismic comparisons could be made by directly subtracting two seismic volumes, usually a baseline and a monitor, acquired at different points in time, usually months or years apart. This is referred to as the 4D seismic difference or 4D difference. What we observe in the 4D difference are generally attributed to changes in the reservoir, assuming, of course, that the monitor and baseline data sets have undergone a similar, if not identical, processing sequence and were carefully matched to compensate for differences in acquisition geometry, mechanical source and receiver signatures etc. Since the conventional subtraction method is a straight sample-by-sample subtraction of the two data sets, minor differences, especially in the phase or timing of the events, can cause large events in the output volume which can easily be mistaken for a 4D event. This often results in a 'coherent' seismic noise and primarily arises due to gap in coverage on one of the vintages, from acquisition, or residual statics differences between the vintages after processing. There can also be other type of specular or random noise on the 4D difference that usually impedes an interpreter from detecting or observing an actual 4D signal. This often results in an 'incoherent' seismic noise and is observed on a 4D difference volume after all processing, due to non-cancellation of migration swings, presence of residual multiples, swells, etc. between the vintages.

Efficient and effective methods for attenuating noise and isolating signal in seismic data are needed to improve the final seismic image and allow differentiating the 4D changes between the baseline and monitor seismic datasets. A methodology/workflow has been recently developed to remove migration swings, residual multiples and non-co located noise as observed on a 4D difference section. A 4D difference section between two vintages acquired over different periods of time over a producing reservoir tends to highlight changes due to production over the reservoir interval (rock property change due to change in pressure, fluid saturation etc.). If the acquisition and processing were ideal, then one would expect to see just this change due to physical properties over the reservoir interval. But differences in acquisition and processing tend to leave behind a lot of '4D noise' that are not related to production. This 4D noise can be coherent or random in nature and can occur anywhere in the seismic data. The flowchart described in FIG. 1, referred to as the 'curvelet4D' workflow uses an initial realization between two datasets that were surveyed over the same subsurface location to come up with a common noise template and uses a Complex valued, Multi resolution, Directional Transform (CMDT), in particular a complex curvelet transform, to separate signal from noise. This process can be iterated multiple times until a pre-defined threshold based on a single or multiple 4D attributes is met.

U.S. Pat. No. 8,280,695, the entirety of which is hereby incorporated by reference, describes a method to adapt a template dataset to a target dataset by using curvelet representations. The template may be used to remove noise from, or interpret noise in, the target data set. The target data set is transformed using a selected complex-valued, directional, multi-resolution transform ('CDMT') satisfying the Hubert transform property at least approximately. An initial template is selected, and it is transformed using the same CDMT. Then the transformed template is adapted to the transformed target data by adjusting the template's expansion coefficients within allowed ranges of adjustment so as to better match the expansion coefficients of the target data set. Multiple templates may be simultaneously adapted to better fit the noise or other component of the data that it may be desired to represent by template.

U.S. Patent Publication 2013/0253838, the entirety of which is hereby incorporated by reference, describes a system and method for processing 4D seismic data. A system and method for determining a 4D difference from 4D seismic data includes receiving a baseline seismic dataset and a monitor seismic dataset; identifying a 4D signal present in the monitor seismic dataset to create a 4D monitor dataset and a signal in the baseline seismic dataset which matches the monitor seismic dataset to create a baseline matching signal dataset; differencing the baseline matching signal dataset and the baseline seismic dataset to create a 4D baseline dataset; and differencing the 4D baseline dataset and the 4D monitor dataset to create a 4D difference dataset. In an embodiment, a multi-scale, multi-directional transform is used to identify the 4D signal present in the monitor seismic dataset and the signal in the baseline seismic dataset which matches the monitor seismic dataset.

International Patent Publication WO 2015/036515, the entirety of which is hereby incorporated by reference, describes methods and apparatus for cooperative noise attenuation in data sets related to the same underground formation. Cooperative attenuation methods are applied to data sets acquired by surveying a same underground formation which therefore include substantially the same primary signal and different individual noise. The data sets are converted in a wavelet basis by applying a high angular resolution complex wavelet transform. When corresponding coefficients of the data set representations in the wavelet basis differ more than predefined thresholds the coefficients are attenuated as corresponding to noise.

SUMMARY

A computer implemented method for denoising a set of seismic datasets, specifically belonging to different 3D subsets of a 4D survey the method comprising: (a) receiving a baseline and a monitor seismic dataset which were acquired by surveying over the same subsurface formation over different periods of time; (b) cross-equalizing the monitor seismic dataset to match to the baseline seismic dataset in terms of amplitude, frequency, phase and timing of events; (c) computing an initial 4D difference between the monitor and baseline seismic datasets; (d) formulating a common noise template from the initial 4D difference; (e) de-noising the baseline and monitor seismic datasets, independently, using the common noise template in a curvelet domain; (f) updating the initial 4D difference to form an updated 4D difference, which reflects de-noised baseline and monitor datasets from step (e); and (g) iterating the steps (d) through (f) until the updated 4D difference satisfies a predetermined criteria.

In the method, the receiving the baseline and monitor datasets can include using full or partial stacks after migration where source-receiver azimuths are similar between the baseline and monitor datasets.

In the method, the cross-equalizing can include: (b1) matching the frequency and the phase of the monitor seismic survey to that of the baseline seismic survey using least squares filters designed at an overburden to exclude any production related differences due to fluid movement or pressure related changes at a reservoir; (b2) cross-normalizing the amplitude of the monitor seismic survey to that of the baseline seismic survey by fitting a polynomial function to capture any time and spatially varying changes in the amplitude at the overburden between the baseline and monitor seismic datasets, and applying the time and spatially varying changes to the monitor seismic dataset to match its amplitude to that of baseline seismic dataset; and (b3) computing and applying time varying time shifts on the monitor seismic dataset after steps (a) and (b), using cross-correlation or other 2D or 3D warping based approaches to minimize accumulating any false 4D signal, that may not be related to actual hydrocarbon production, on the 4D difference.

In the method, the computing the initial 4D difference can include taking a direct sample-by sample difference between the monitor seismic dataset and the baseline seismic dataset.

In the method, the formulating the common noise template can include: (d1) applying a 3D structural smoothing on the initial 4D difference using a dip based structural smoothing; and (d2) subtracting the 3D smoothed version of the initial 4D difference from the initial 4D difference using adaptive subtraction.

In the method, the de-noising can include: (e1) transforming the common noise template and the monitor and baseline seismic datasets to a complex-valued, directional, multi-resolution transform (CDMT) domain with a curvelet transform; (e2) adapting expansion coefficients of the common noise template, in the CDMT domain, to create an adapted template, within predetermined ranges of adjustment so as to better match expansion coefficients of the baseline and monitor seismic datasets, wherein the ranges provide a range of adjustment for magnitude of each complex coefficient and phase of each complex coefficient, which constrain the adapting of the common noise template, and said ranges being selected to balance tradeoff between noise subtraction and signal preservation when the adapted template is subtracted from the monitor and baseline seismic datasets; (e3) subtracting the adjusted template from expansion coefficients of the monitor and baseline seismic data sets; and (e4) transforming the monitor and baseline seismic datasets, after step (c), back to an original domain through an inverse curvelet transform.

In the method, the predetermined criteria in the iterating can include comparing a 4D seismic attribute of normalized root mean square, cross correlation, time shift, predictability, or 4D signal to noise ratio values to a threshold.

The method can further include outputting a final 4D difference after a satisfactory threshold of the 4D seismic attribute aforementioned set of 4D seismic attributes is reached.

In the method, the adapting the expansion coefficients of the common noise template can include adjusting both the magnitude and the phase to those of the monitor and baseline seismic datasets.

The method can further include delineating a change in a reservoir from the updated 4D difference.

In a second computer implemented method for denoising a set of seismic datasets, along with one of their realizations, the second method can include: (a) receiving at least a first dataset, a second dataset, and a third data set, which were acquired by surveying over a same subsurface formation; (b) computing an initial realization of the at least first, second, and third datasets; (c) formulating a common noise template from the initial realization; (d) de-noising the at least first, second and third datasets, independently, using the common noise template in a curvelet domain; and (e) updating the initial realization to form a final realization of the first, second and third datasets which reflects de-noised datasets from step (d).

In the second method, the receiving can include acquiring the first, second and third datasets by surveying a same subsurface formation, and the second method can further include: using different source-receiver offset pairs, that were acquired as a part of a same 3D survey; using full or partial stacks, that were acquired using different 3D surveys, over different periods of time, which may have different source-receiver azimuths between the surveys; or using full or partial stacks, that were acquired using different 3D surveys, over different periods of time, wherein the source-receiver azimuth is maintained as close as possible between the surveys.

In the second method, the computing the initial realization can include at least partially summing or stacking a subset of the received datasets.

In the method, the formulating the common noise model can include: (c1) using a 3D smoothing on the initial realization that is a horizontal moving average filter or a better signal-preserving dip based structural smoothing; and (c2) subtracting the 3D smoothed version of the initial realization from the initial realization using an adaptive subtraction scheme.

In the second method, the denoising can include transforming the common noise template and the first, second, and third datasets to a complex curvelet domain, adjusting both phase and magnitude of expansion coefficients of the common noise template within the transform domain to match to expansion coefficients of each of the first, second and third datasets, independently, subtracting the adjusted template from each of the first, second, and third datasets followed by transforming back to an original data domain using an inverse curvelet transform.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION OF EXAMPLE EMBODIMENTS

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The present technological advancement may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present technological advancement may be coded in different languages for application in a variety of computing platforms and environments. It will be appreciated that the scope and underlying principles of the present invention are not limited to any particular computer software technology.

Moreover, those skilled in the art will appreciate that the present technological advancement may be practiced using any one or combination of hardware and software configurations, including but not limited to a system having single and/or multiple processor computers, hand-held devices, tablet devices, programmable consumer electronics, mini-computers, mainframe computers, and the like. The present technological advancement may also be practiced in distributed computing environments where tasks are performed by servers or other processing devices that are linked through one or more data communications networks. In a distributed computing environment, program modules may be located in both local and remote computer storage media including memory storage devices. The present technological advancement can also be practiced as part of a down-hole sensor or measuring device, as the present technological advancement can be used for VSP or DAS 4D application (both being downhole sensor methods).

Also, an article of manufacture for use with a computer processor, such as a CD, pre-recorded disk or other equivalent devices, may include a tangible computer program storage medium and program means recorded thereon for directing the computer processor to facilitate the implementation and practice of the present invention. Such devices and articles of manufacture also fall within the spirit and scope of the present technological advancement.

Referring now to the drawings, embodiments of the present technological advancement will be described. The present technological advancement can be implemented in numerous ways, including, for example, as a system (including a computer processing system), a method (including a computer implemented method), an apparatus, a computer readable medium, a computer program product, a graphical user interface, a web portal, or a data structure tangibly fixed in a computer readable memory. Several embodiments of the present technological advancement are discussed below. The appended drawings illustrate only typical embodiments of the present technological advancement and therefore are not to be considered limiting of its scope and breadth.

The present technological advancement relates to processing 4D seismic data to recover 4D signal components, that are production related, via iterative noise attenuation of non-colocated coherent and incoherent noise, by formulating a common noise model from an initial sample-by-sample difference of the 4D datasets, which could be a 4D difference, and comparing the 3D subsets of the 4D seismic volumes, in the transform domain of a complex-valued, directional, multi-resolution transform (CDMT), but not limited to, the complex curvelet transform. The transform maps data into a higher-dimensional space allowing a comparison of localized wavefield components with different frequency, location and direction as opposed to performing the conventional sample-by-sample comparison via straight subtraction. Therefore, a superior result can be expected for the recovery of the 4D wavefield differences between the two seismic volumes with fewer artifacts and less noise outside the reservoir zone where no 4D differences are present. The resulting volume can be used for interpretation, hydrocarbon management, or can serve as input for further processing such as the estimation of reservoir properties. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

Figure 1:
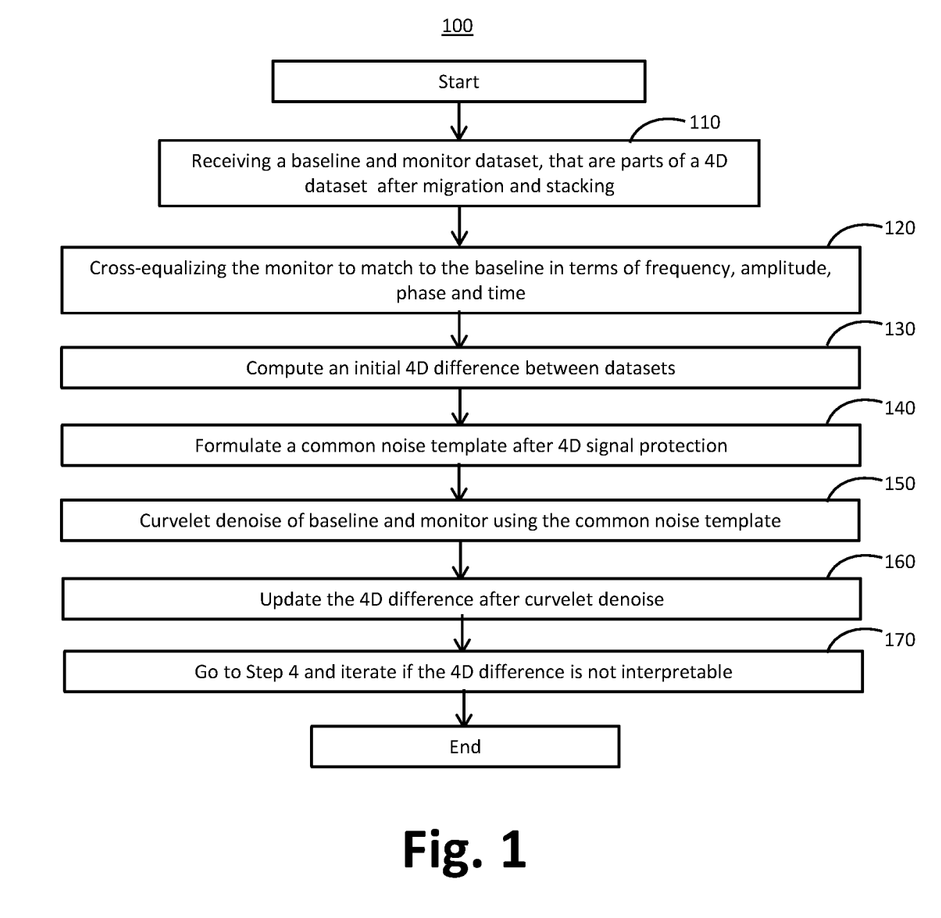
FIG. 1 illustrates a method embodying the present technological advancement.

One embodiment of the present technological advancement is shown as method 100 in FIG. 1. At operation 110, a baseline and monitor datasets (combined referred to as 4D datasets) that are parts of the same 4D monitoring program are received. The monitor survey is usually acquired after a certain time has lapsed since the baseline survey. At this stage, the 4D datasets are assumed to have gone through a traditional processing sequence to remove acquisition related noise and artifacts like sea swells, statics and any other footprint on the data that is non-geologic. Obtaining the 4D datasets is shown as operations 202, 203 in FIG. 2 for method 200 can be arranged in many ways, not just limiting to, full or partial stacks of seismic data, common shot gather, common receiver gather, common image (offset or angle) gathers, common reflection point, offset vector tiles and maybe sorted or arranged in different directions such as an inline, crossline or depth/time slices; combinations of these also may be used. The receiving the baseline and monitor datasets can include using full or partial stacks after migration where source-receiver azimuths are similar between the baseline and monitor datasets. In the 4D world, we generally use delta_Source+delta_Receiver (dSdR) as a criteria to check source-receiver azimuth. In other words, this is the sum of distance between sources and distance between receivers. The smaller the dSdR, the better the 2 datasets match in terms of azimuth. One skilled in the art will appreciate that other arrangements of the 4D datasets that are possible can also be used as input for operation 110. Moreover, the seismic datasets could be recorded using active or passive sources and may come from marine surveys like Narrow Azimuth Towed Streamers (NATS), Wide Azimuth Towed Streamers (WATS), Ocean Bottom Cable/Node/Streamer (OBC, OBN, OBS), coil shooting or land-based surveys using geophones or accelerometers in any number of receiver array configurations like 2D surveys, 3D surveys, wide azimuth or full azimuth surveys. Combinations of different source or receiver types may be used. Moreover, one or more of the seismic datasets maybe a synthetic data generated using a computer program.

The next step is operation 120 shown in FIG. 1 where the monitor data is cross-equalized to match the baseline in terms of frequency, amplitude, phase and/or time. This operation is detailed in method 200a of FIG. 2A. The baseline dataset maybe used as a reference and the monitor as the template, to match to the reference, as shown in operations 201a and 202a or it can be vice-versa. The next step in method 200a of FIG. 2A is spectral matching, represented as operation 203a, which involves matching the frequency and/or phase of the monitor to that of the baseline in a global or local sense, typically but not limited to, using least squares filters, designed at the overburden to exclude any production related differences due to fluid movement or pressure related changes at the reservoir. Spectral matching usually tries to match the frequency and phase between a baseline and a monitor dataset but the amplitudes are left unchanged. Especially, there could be depth/time and spatially varying amplitude differences in the overburden between the baseline and monitor which could also introduce an over or under exaggerated amplitude difference at the reservoir level. The operation 204a is aimed at quickly healing or normalizing the amplitudes between the baseline and the monitor, in the overburden, typically, but not limited to, by fitting a simple 1D polynomial function to capture any time/depth and spatially varying changes, and applying these changes to the monitor to match its amplitude to that of baseline so that they match in a 'statistical' sense. The next operation in method 200a is computing and applying time varying time shifts (TVTS) on the monitor to match the baseline, which is operation 205a. The TVTS may be computed in a 1D, 2D or 3D sense and those skilled in this art can identify an appropriate technique using cross-correlation, dynamic warping or other similar approaches. The result of method 200a is a cross-equalized template 206a.

Returning to FIG. 1, the method 100 further includes computing a 4D difference section between datasets, in step 130. This is usually, but not limited to, a direct sample-by-sample difference between the baseline and monitor. The next step, 140, is 4D signal protection, before formulating the common noise template. These are represented by steps 206 and 207 respectively in method 200 of FIG. 2, in the flow diagram. The step 206 in FIG. 2 can be further broken down as method 200b in FIG. 2B. It typically involves applying a 3D structural smoothing (202b) on the initial 4D difference (201b) using, but not limited to, a dip based structural smoothing and then subtracting the 3D smoothed version of the initial 4D difference from the initial 4D difference using an adaptive subtraction scheme (203b) using, but not limited to, least squares based techniques. Method 200b yields common noise template 204b. Those skilled in this art can identify other similar approaches for the method 200b where the goal is to get a common noise template which has minimum leakage of any coherent signal that is oriented along a geologic structure. The goal, for step 200b, is to further provide a good first pass noise template to the curvelet adaptive de-noise in the next step, 150 of FIG. 1.

Figure 2:
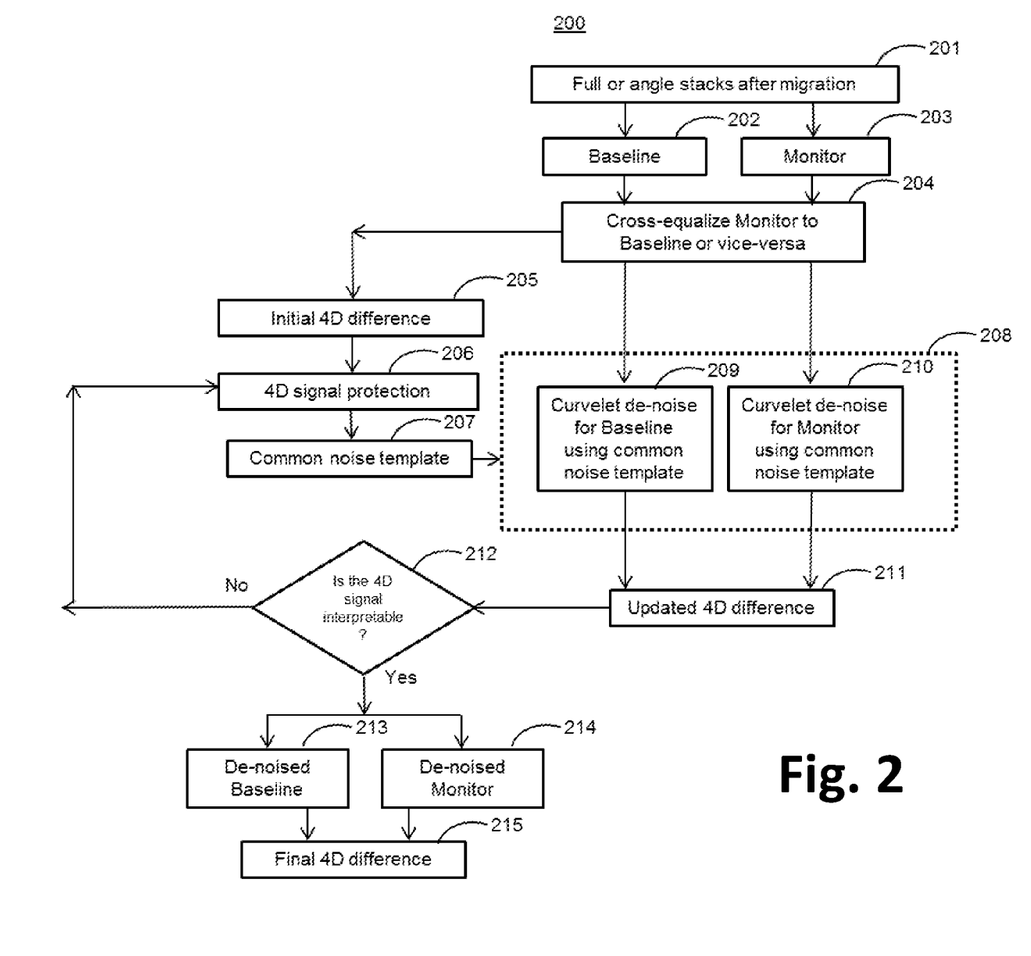
FIG. 2 illustrates, with greater detail, the method of FIG. 1.
Figure 2A:
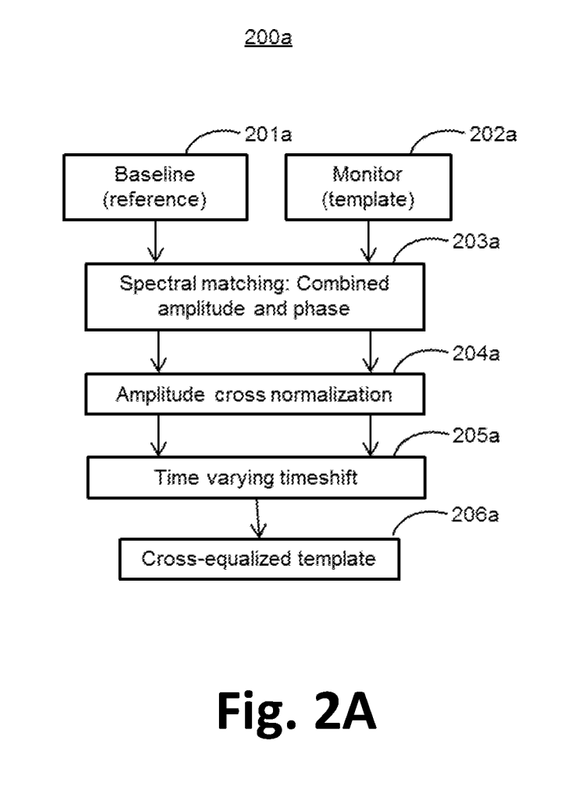
FIG. 2A illustrates a method of cross-equalization useable in the method of FIGS. 1 and 2.
Figure 2B:
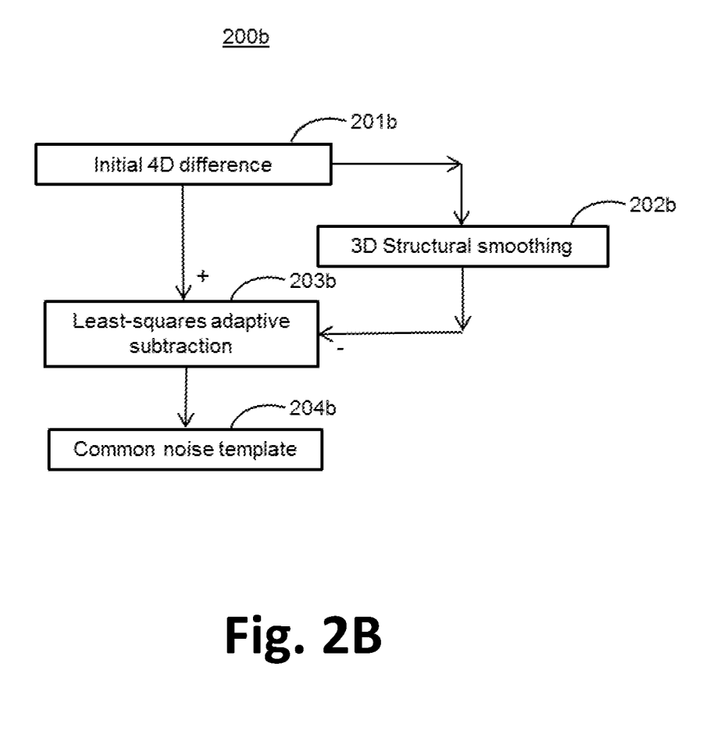
FIG. 2B illustrates a method of 4D signal protection useable in the method of FIGS. 1 and 2.
Figure 3:
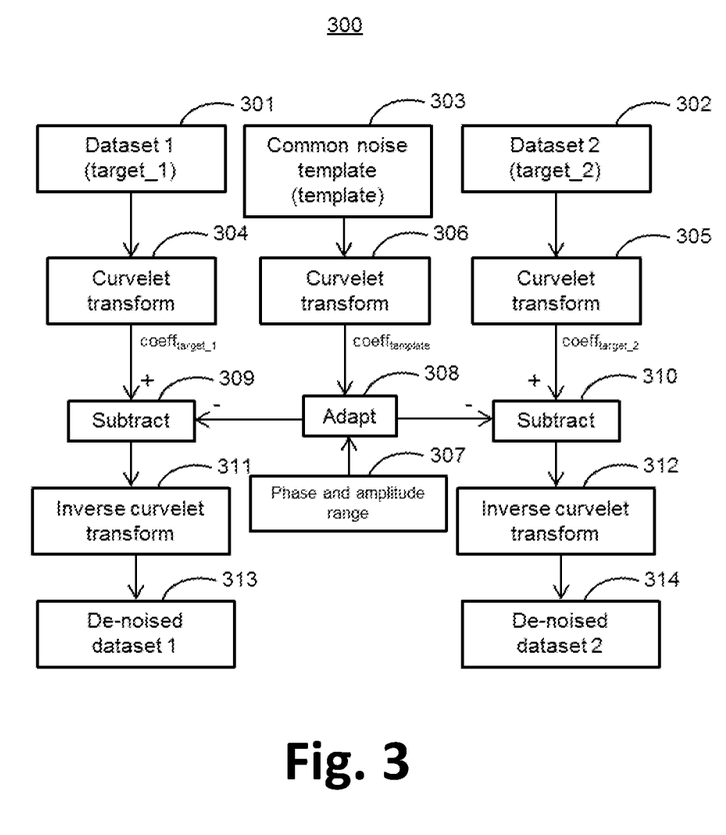
FIG. 3 illustrates a curvelet adaptive denoise method useable in the method of FIGS. 1 and 2.

Method 100 further includes step 150, which is de-noising the baseline and monitor datasets using the common noise template in the curvelet domain, which is further depicted in FIGS. 2 as 208, 209, and 210. This denoising is further explained in detail in method 300 of FIG. 3. The dataset_1, shown in step 301 of method 300 and the dataset_2, shown in step 302 of method 300 may be substituted with the baseline and monitor datasets. Method 300 further includes transforming the common noise template (303) and target datasets (301, 302) to a complex-valued, directional, multi-resolution transform (CDMT), in particular, a complex curvelet transform (304, 305, and 306). Once in curvelet domain, the expansion coefficients of common noise template are adapted (308) within allowed ranges of adjustment so as to better match the expansion coefficients of the target datasets. A user can optionally provide a range of adjustment (307) for the magnitude of each complex coefficient and a range of adjustment for the phase of each complex coefficient, thereby constraining the adapting of the common noise template, the ranges of adjustment being selected to balance tradeoff between noise subtraction and signal preservation when the adapted template is subtracted from the target dataset. The adaptation parameters of the template to each target datasets is usually chosen to be similar for each set of template-target pairs, especially for 4D datasets. The adjusted coefficients of the common noise template are then subtracted from each of the target's expansion coefficients (309 and 310). The last step involves transforming the target datasets back to their original domain through inverse complex curvelet transform (311,312), and yielding de-noised dataset 1 (313) and de-noised dataset 2 (314).

Prior techniques, such as U.S. Pat. No. 8,280,695, describe adapting a template to a target dataset (see FIG. 5 in U.S. Pat. No. 8,280,695). However, U.S. Pat. No. 8,280, 695 describes the process of using an existing noise template(s) to denoise a target for 3D data and does not describe the processing of 4D data. The present technological advancement is different because it establishes a way to formulate a reasonably good noise model so that a single, common template can be used to denoise multiple vintages from a 4D monitoring program.

Returning to FIG. 1, the next step in the workflow is step 160 in method 100 which involves updating the initial 4D difference to form an updated 4D difference (211), after curvelet denoise, that uses the same method described in step 130. At this point, as shown in operation 212 of method 200, a computer automated approach can be implemented to check if the 4D signal in the updated 4D difference is interpretable. This can be implemented by setting thresholds on a single or a combination of 4D attributes like, but not limited to, Normalized Root Mean Square (NRMS), cross correlation, time shift, predictability, 4D signal to noise ratio (4D SNR). If the criteria is not met, the processor has the ability to go back to step 140 in method 100 and iterate through steps 140 to 160 before evaluating the criteria again using step 212 in method 200. The final 4D difference is then computed and output, as shown in step 215 of method 200, along with the individual denoised baseline and monitor datasets, as shown in steps 213 and 214 of method 200, after the criteria in step 212 of method 200 is met.

Figure 4:
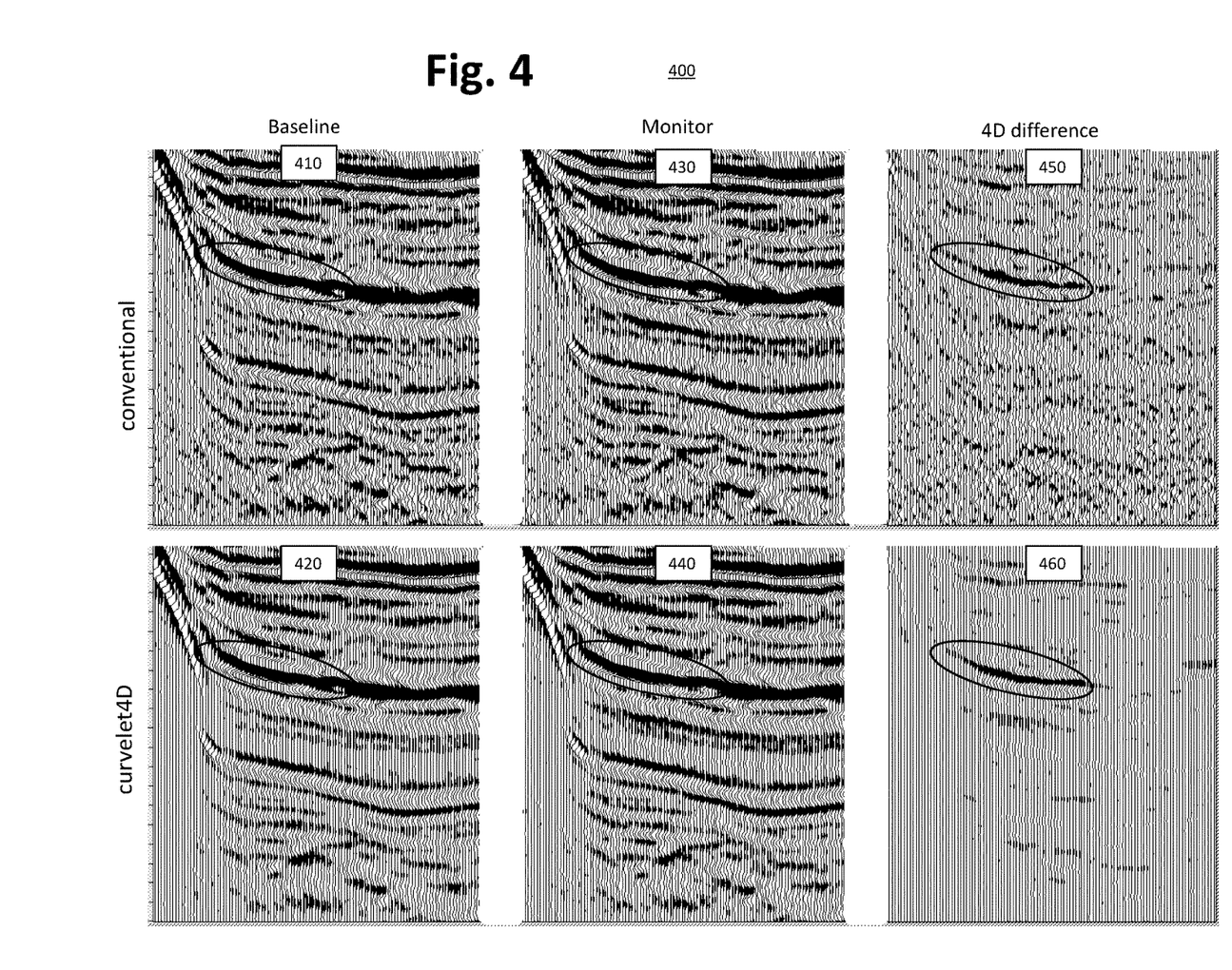
FIG. 4 illustrates a comparison of conventional technology to the present technological advancement.

The application of the present technological advancement as shown in method 100, to a real 4D seismic data with baseline and monitor acquired over different periods of time, which has hydrocarbon production related changes, is shown in FIG. 4. Baseline seismic dataset 410 was surveyed before any hydrocarbon production and the wiggle plot is the seismic amplitudes for a cross section of the earth's subsurface, over specific geologic time scale, which represents the change in impedance as the wavefront from the seismic source traverses through the subsurface rocks and fluid filled formations. In particular, the oval portion in 410 signifies hydrocarbon bearing sands within a rock formation. The oval portion in monitor seismic dataset 430 represents a snapshot of similar time and spatial interval, which was surveyed after some years since he baseline seismic was surveyed. 4D difference 450 shows a sample-by-sample difference, between 430 and 410. This oval section in the 4D difference 450 shows some seismic amplitude, within the hydrocarbon bearing sands, which are actually related to hydrocarbon production from that interval. We also know, a priori, that there has been no hydrocarbon production nor we expect to see any fluid or pressure related changes anywhere outside the oval section of 450. This implies that the actual 4D signal is confined to the oval section of 450. Also the smaller seismic amplitudes other than the continuous black portion of the wiggles, within the oval section in 450, are side lobes which can be categorized as noise. 410, 430 and 450 comprise a conventional method which is usually the final products that are used to make drilling decisions.

The bottom part of FIG. 4 represents a baseline 420, a monitor 440, and the 4D difference 460 after applying the present technological advancement described in FIG. 2. The seismic sections shown in 420 and 430 have better signal-to-noise ratio, with less side lobe energy and less non-geologic events, compared to 410 and 430. The 4D signal represented by the oval section in 460 is more coherent, cleaner with less side lobes and geologically oriented along the dipping beds of the formation rocks as seen on the respective 3D sub sections (420, 440). Moreover, a key aspect for 4D de-noise is to preserve true amplitudes while removing the noise. This is satisfied by the present technological advancement where the true relative amplitudes are preserved in the 4D signal as seen on 460, compared to the conventional technique in 450. Moreover the noise outside the oval region is considerably reduced in the present technological advancement, as seen on 460, compared to the conventional technique in 450.

Figure 5:
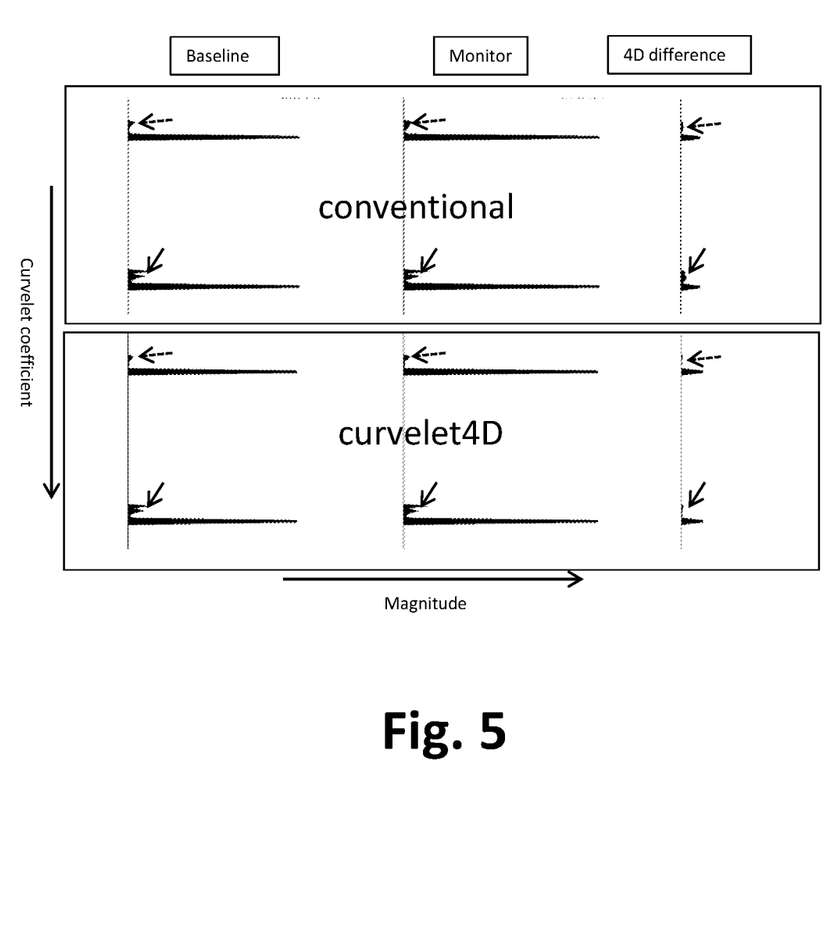
FIG. 5 illustrates a comparison of conventional technology to the present technological advancement.

Referring to FIG. 5, similar observations to those of FIG. 4 can be made, but in the complex curvelet domain (frequency, dips, direction) rather than the data domain (time, space). 501, 503 and 505 of FIG. 5 represents the magnitude of the complex curvelet coefficient (also referred as expansion coefficient) for baseline, monitor and 4D difference, going from left to right, for a conventional technique. In particular, they correspond to the curvelet coefficients of the oval sections shown in FIG. 5, which is in a zone with a real 4D signal. The corresponding analogues for the present technological advancement are shown in 502, 504 and 506 respectively. The dotted and solid arrows further represent the noise that can be distinguished very well compared to the signal shown by the black peaks, right beside them. Specifically, in the conventional technique, the dotted arrows in 501 and 503 refer to the coefficients of the noise for baseline and monitor, respectively. Similarly, the dotted arrows in 502 and 504 refer to the present technological advancement's noise coefficients for baseline and monitor, respectively. 505 and 506 represent the expansion coefficients of the 4D difference for a conventional technique and present technological advancement. In particular, the dotted arrows in 505 and 506 correspond to the expansion coefficient of the same event, over a location, in the time-space domain and the solid arrows in steps 505 and 506 correspond to expansion coefficients of the same events, but at a different location, in the time-space domain. The dotted and solid arrows for the conventional technique, in 505, and the present technological advancement, in 506, moreover correspond to the expansion coefficients of a noisy event (also referred to as the 4D noise) on the 4D difference section. The magnitude of the 4D noise's expansion coefficient for the present technological advancement, in 506, is very minimal compared to that of a conventional technique in 505. But the magnitude of expansion coefficients for the real 4D signal, that is represented by the black peaks adjacent to the arrowed locations, in 505 and 506, are left unchanged. One skilled in the art can then infer that the 4D signal-to-noise ratio for the present technological advancement has been improved, compared to the conventional technique, without changing the actual amplitude 4D signal. Similar observations can be inferred for the phase of 4D signal as well.

Figure 6:
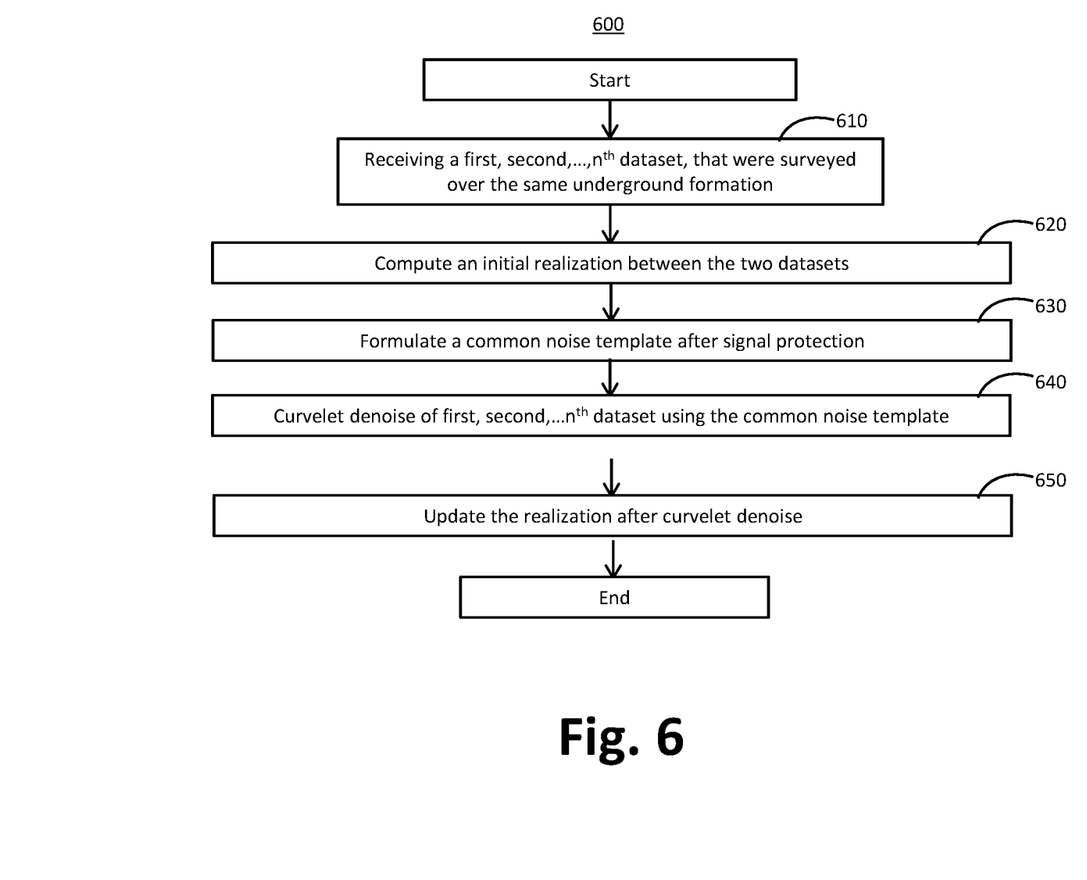
FIG. 6 illustrates a method embodying the present technological advancement.

Another example of the present technological advancement, as shown in method 600 of FIG. 6, involves receiving 'n' datasets (steps 610, 702, 703, and 704), with n' being a positive integer, that were surveyed over the same underground formation. The datasets may be, but not just limited to, different source-receiver offsets belonging to a 3D survey, different 3D surveys that were shot at different azimuths or 3D subsets of different 4D surveys that belong to the same seismic monitoring program (701). The next step is to compute an initial realization of the datasets, shown in step 620 of FIG. 6 and step 705 in FIG. 7, which could comprise, but not limited to, using a simple arithmetic operation like summation or stacking of the full or a partial set of n datasets. This is followed by a signal protection flow in step 630 and step 706, which is further shown in FIG. 7a, wherein a 2-D or 3-D structurally smoothed version of the initial realization (702a) is subtracted (703a) from the initial realization (701a) to form the common noise template, shown in step 704a and step 707. The common noise template is then used to de-noise (640) by adapting the magnitude and phase of the expansion coefficients to each of the n dataset's expansion coefficients in the complex curvelet domain, referring back to method 300 of FIG. 3 (and corresponding to 708, 709, 710, 711, 712, 713, and 714).

Figure 7:
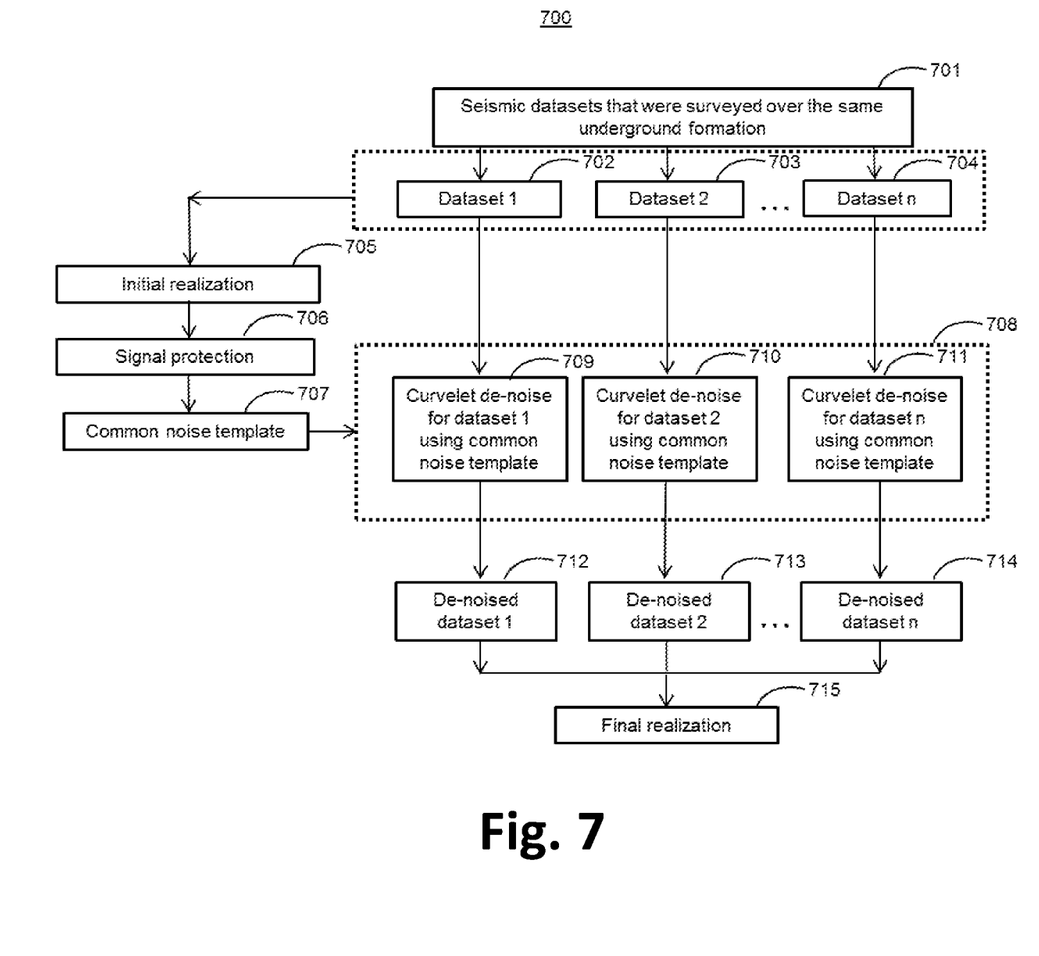
FIG. 7 illustrates a curvelet 4D method useable with the method of FIG. 6.
Figure 7A:
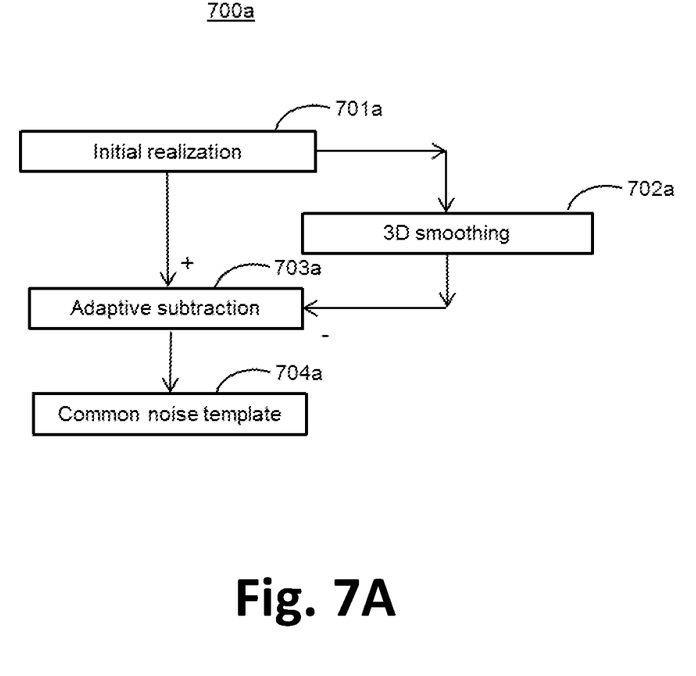
FIG. 7A illustrates a signal protection method useable with the methods FIGS. 6 and 7.

The de-noised versions of the n datasets can then be used to generate the updated realization, as shown in step 650 and 715.

The foregoing application is directed to particular embodiments of the present technological advancement for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, some or all of the steps in the present inventive method are performed using a computer, i.e. the invention is computer implemented. In such cases, the resulting gradient or updated physical properties model may be downloaded or saved to computer storage.

I claim:

1. A computer implemented method for de-noising a set of seismic datasets belonging to different 3D subsets of a 4D survey, the method comprising:
   (a) receiving a baseline and a monitor seismic dataset which were acquired by surveying over the same subsurface formation over different periods of time;
   (b) cross-equalizing the monitor seismic dataset to match to the baseline seismic dataset in terms of amplitude, frequency, phase and timing of events;
   (c) computing an initial 4D difference between the monitor and baseline seismic datasets;
   (d) formulating a common noise template from the initial 4D difference;
   (e) de-noising the baseline and monitor seismic datasets, independently, using the common noise template in a curvelet domain, wherein the de-noising comprises:
      (e1) transforming the common noise template and the monitor and baseline seismic datasets to a complex-valued, directional, multi-resolution transform (CDMT) domain with a curvelet transform;
      (e2) adapting expansion coefficients of the common noise template, in the CDMT domain, to create an adapted template, within predetermined ranges of adjustment so as to better match expansion coefficients of the baseline and monitor seismic datasets, wherein the ranges provide a range of adjustment for magnitude of each complex coefficient and phase of each complex coefficient, which constrain the adapting of the common noise template, and the ranges being selected to balance tradeoff between noise subtraction and signal preservation when the adapted template is subtracted from the monitor and baseline seismic datasets;
      (e3) subtracting the adjusted template from expansion coefficients of the monitor and baseline seismic data sets; and
      (e4) transforming the monitor and baseline seismic datasets, after step (e3), back to an original domain through an inverse curvelet transform;
   (f) updating the initial 4D difference to form an updated 4D difference, which reflects de-noised baseline and monitor datasets from step (e);
   (g) iterating the steps (d) through (f) until the updated 4D difference satisfies a predetermined criteria; and
   (h) outputting a final 4D difference volume.

2. The method of claim 1, wherein the receiving the baseline and monitor datasets includes using full or partial stacks after migration where source-receiver azimuths are similar between the baseline and monitor datasets.

3. The method of claim 1, wherein the cross-equalizing comprises:
   (b1) matching the frequency and the phase of the monitor seismic survey to that of the baseline seismic survey using least squares filters designed at an overburden to exclude any production related differences due to fluid movement or pressure related changes at a reservoir;
   (b2) cross-normalizing the amplitude of the monitor seismic survey to that of the baseline seismic survey by fitting a polynomial function to capture time and spatially varying changes in the amplitude at the overburden between the baseline and monitor seismic datasets, and applying the time and spatially varying changes to the monitor seismic dataset to match its amplitude to that of baseline seismic dataset; and
   (b3) computing and applying time varying time shifts on the monitor seismic dataset after steps (a) and (b), using cross-correlation or other 2D or 3D warping based approaches to minimize accumulating any false 4D signal, that are not related to actual hydrocarbon production, on the 4D difference.

4. The method of claim 1, wherein the computing the initial 4D difference comprises taking a direct sample-by-sample difference between the monitor seismic dataset and the baseline seismic dataset.

5. The method of claim 1, wherein the formulating the common noise template comprises:
   (d1) applying a 3D structural smoothing on the initial 4D difference using a dip based structural smoothing, and creating a 3D smoothed version of the initial 4D difference; and
   (d2) subtracting the 3D smoothed version of the initial 4D difference from the initial 4D difference using adaptive subtraction.

6. The method of claim 1, wherein the predetermined criteria in the iterating includes comparing a 4D seismic attribute of normalized root mean square, cross correlation, time shift, predictability, or 4D signal to noise ratio values to a threshold.

7. The method of claim 6, further comprising outputting a final 4D difference after the threshold of the 4D seismic attribute is reached as a result of the iterating.

8. The method of claim 1, wherein the adapting the expansion coefficients of the common noise template comprises adjusting both the magnitude and the phase to those of the monitor and baseline seismic datasets.

9. The method of claim 1, further comprising delineating a change in a reservoir from the updated 4D difference.

10. A computer implemented method for de-noising a set of seismic datasets, along with one of their realizations, the method comprising:
    (a) receiving a plurality of n datasets, where n is greater than 2, which were acquired by surveying over a same subsurface formation;
    (b) computing an initial realization of the n datasets;
    (c) formulating a common noise template from the initial realization;
    (d) de-noising the n datasets, independently, using the common noise template in a curvelet domain, wherein the de-noising includes transforming the common noise template and the n datasets to a curvelet domain, adjusting, independently, both phase and magnitude of expansion coefficients of the common noise template within the curvelet domain to match to expansion coefficients of each of the n datasets, which creates an adjusted template, and subtracting the adjusted template from each of the n datasets followed by transforming back to an original data domain using an inverse curvelet transform;

(e) updating the initial realization to form a final realization of the n datasets which reflects de-noised datasets from step (d); and (f) outputting the final realization.

11. The method of claim 10, wherein the receiving includes acquiring the n datasets by surveying a same subsurface formation, and the method further comprises:

using different source-receiver offset pairs, which were acquired as a part of a same 3D survey;

using full or partial stacks, that were acquired using different 3D surveys, over different periods of time, which may have different source-receiver azimuths between the surveys; or using full or partial stacks, that were acquired using different 3D surveys, over different periods of time, wherein the source-receiver azimuth is maintained as close as possible between the surveys.

12. The method of claim 10, wherein the computing the initial realization comprises at least partially summing or stacking a subset of the n datasets.

13. The method of claim 10, wherein the formulatin the common noise model comprises:

(c1) using a 3D smoothing on the initial realization that is a horizontal moving average filter or a signal-preserving dip based structural smoothing, and creating a 3D smoothed version of the initial realization; and (c2) subtracting the 3D smoothed version of the initial realization from the initial realization using adaptive subtraction.

14. The method of claim 1, further comprising using the final 4D difference volume for hydrocarbon management of the subsurface formation.

15. The method of claim 10, further comprising using the final realization for hydrocarbon management of the subsurface formation.

* * * * *